Patented Aug. 26, 1924.

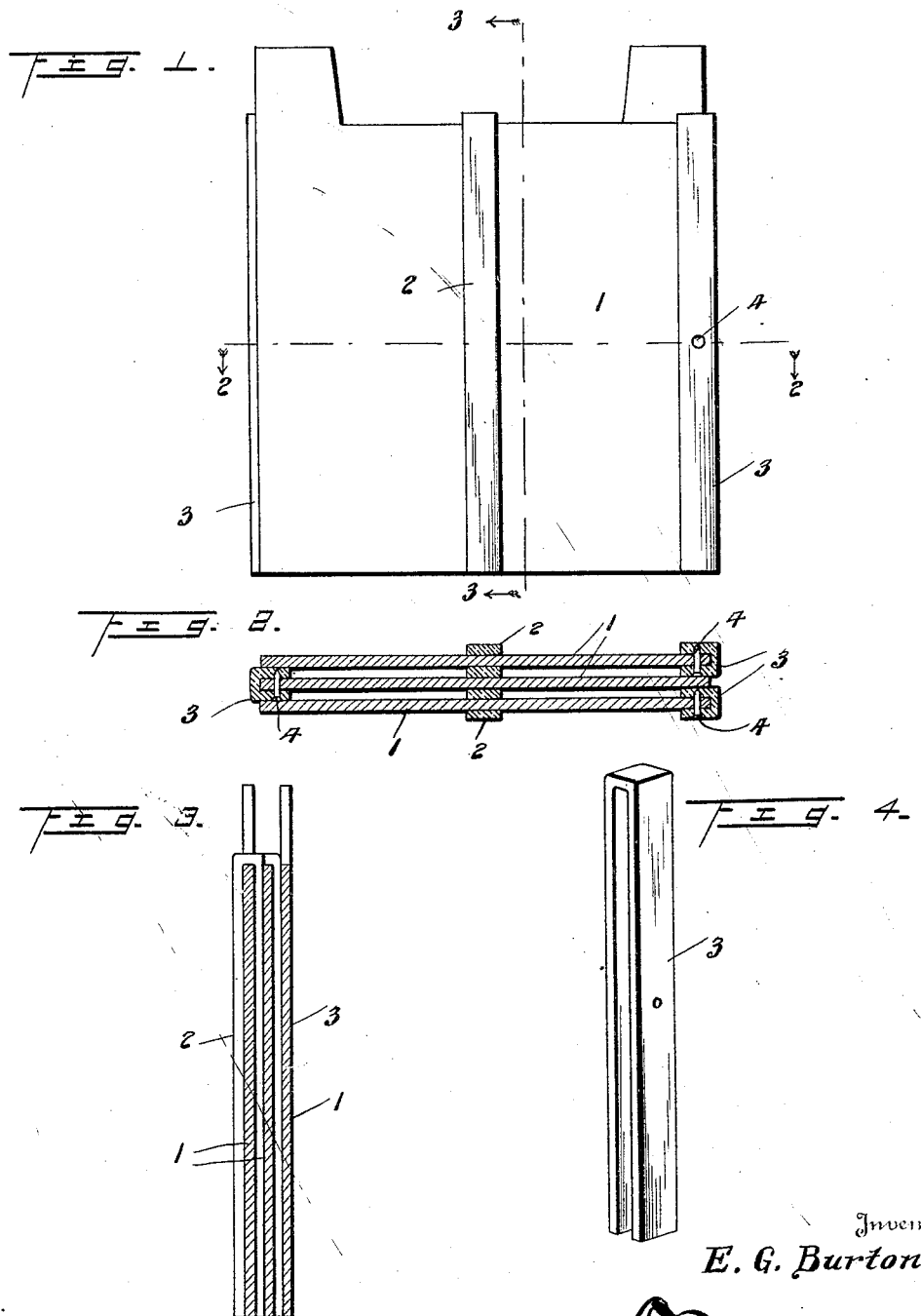

1,506,561

UNITED STATES PATENT OFFICE.

ELBERT G. BURTON, OF COLUMBIA, TENNESSEE.

SEPARATOR FOR STORAGE BATTERIES.

Application filed March 27, 1923. Serial No. 628,072.

*To all whom it may concern:*

Be it known that I, ELBERT G. BURTON, a citizen of the United States, residing at Columbia, in the county of Maury and State of Tennessee, have invented certain new and useful Improvements in Separators for Storage Batteries; and I do hereby declare the following to be a full, clear, and exact description of the invention, such as will enable others skilled in the art to which it appertains to make and use the same.

The principal object of the present invention is the provision of a separator for storage batteries substantially in the form of a strip in contradistinction to a solid sheet, whereby to expose a greater surface of the plate with the result of more battery power and at the same time eliminating short circuiting which results from split or defective sheet separators, since the strips may be thick, thereby throwing the plates of the battery to a greater distance apart than is the case where sheet separators are employed.

A further purpose of the invention resides in two or more narrow strips of wood, rubber or other material to be placed between the plates of the battery and held in position by being folded around the plates, or by being pinned or keyed thereto, or by means of pins with nuts fitted thereto, or by mortise keys or pins, or by burning onto the plates.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a front view illustrative of the invention,

Figure 2 is a horizontal section on the line 2—2 of Figure 1,

Figure 3 is a vertical section on the line 3—3 of Figure 1, and

Figure 4 is a detailed perspective view of the preferred form of separator which is constructed of rubber and adapted to be applied to a vertical edge of a plate.

Corresponding and like parts are referred to in the following description and designated in the several views of the drawings by like reference characters.

The numeral 1 designates the plates of a storage battery which may be of any construction and arranged with the positive and negative in alternation. These plates are required to be spaced apart by means of separators and in accordance with the present invention, the usual sheet separators are replaced by strips of insulating material, such as wood, rubber or the like. As a general proposition, the strips are thicker than the ordinary sheet separators and in consequence the plates are spaced apart a greater distance and are not likely to short circuit by walking or buckling. Moreover the strips result in a greater surface of the plates being exposed with the result that the battery posseses greater power than one having a like number of plates and presenting an equal surface.

The numeral 2 designates a strip of insulating material which is folded upon itself and applied to a plate so as to extend over the upper edge and along opposite sides thereof. The numeral 3 designates a separator which is folded intermediate its longitudinal edges so as to embrace opposite sides of an edge portion of the plate and this separator may be held in place by means of a pin 4 or other analogous fastening. The space between the folded side portions is closed at its upper end to engage the top edge of the plate and prevent downward displacement of the separator in the event of the pin 4 or other fastening means being dispensed with. In case the jar for receiving the plates is of a width to engage the end separators 3, outward displacement of the latter is prevented by engaging the inner side of the jar or other receptacle in which the plates of the battery may be placed.

What is claimed is:

A storage battery having edge and intermediate separators in the form of narrow strips, said intermediate strips being substantially U-shaped and adapted to be positioned to straddle the plates and have their bight portions engage the upper edges of the plates, said intermediate separators having their ends terminating flush with the lower edges of the plates, said end strips folded intermediate their longitudinal edges and adapted to fit the vertical edge portions of the plates, the folded portions being connected at their upper edges to engage the top edges of the plates and support the separators and the lower end of said edge separators terminating flush with the lower ends of the plates.

In testimony whereof I affix my signature in presence of two witnesses.

ELBERT G. BURTON.

Witnesses:
J. E. LITTLEFIELD,
JASPER C. TAYLOR.